United States Patent [19]
Ide

[11] Patent Number: 5,530,662
[45] Date of Patent: Jun. 25, 1996

[54] FIXED POINT SIGNAL PROCESSOR HAVING BLOCK FLOATING PROCESSING CIRCUITRY

[75] Inventor: Hisami Ide, Tokyo, Japan

[73] Assignee: NEC Corporation, Tokyo, Japan

[21] Appl. No.: 280,987

[22] Filed: Jul. 27, 1994

[30] Foreign Application Priority Data

Jul. 27, 1993 [JP] Japan ................................. 5-203693
Jul. 27, 1993 [JP] Japan ................................. 5-203693

[51] Int. Cl.$^6$ .................................................. G06F 7/38
[52] U.S. Cl. .......................................... 364/736; 364/748
[58] Field of Search .................................. 364/736, 748, 364/750.5, 758, 759, 760, 745, 746.2, 768

[56] References Cited

U.S. PATENT DOCUMENTS

| | | | |
|---|---|---|---|
| 4,872,132 | 10/1989 | Retter .............................. | 364/748 |
| 4,876,660 | 10/1989 | Owen et al. ....................... | 364/750.5 |
| 4,985,861 | 1/1991 | Yamashina et al. ................ | 364/750.5 |
| 5,031,135 | 7/1990 | Patel et al. ........................ | 364/745 |
| 5,347,480 | 9/1994 | Asghar et al. .................... | 364/736 |
| 5,375,079 | 12/1994 | Uramoto et al. ................... | 364/736 |

*Primary Examiner*—Paul P. Gordon
*Assistant Examiner*—Emmanuel L. Moise
*Attorney, Agent, or Firm*—Whitman, Curtis, Whitham & McGinn

[57] ABSTRACT

A fixed point signal processor includes a general register of "2n+α"-bit width coupled to an arithmetic and logic unit (ALU) of "2n+α"-bit width, a first data memory of "n"-bit width, and a first selection circuit for extending the "n"-bit width data to "2n+α"-bit width to output the extended data to the general register. The first selection circuit selects continuous "n" bits from the "2n+α"-bit width data held in the general register, to output the selected continuous "n" bits to the data memory. A second data memory receives the "2n+α"-bit width data held in the general register for saving a plurality of items of "2n+α"-bit width data, and a register indicates a head position of continuous "n" bits in the "2n+α"-bit width data held in the second data memory. From the "2n+α"-bit width data held in the second data memory, a second selection circuit selects continuous "n" bits starting from the head position, to output the selected continuous "n" bits to the general register. With this arrangement, a block floating processing is realized in hardware circuitry.

20 Claims, 4 Drawing Sheets

FIXED POINT SIGNAL PROCESSOR HAVING BLOCK FLOATING PROCESSING CIRCUITRY

BACKGROUND OF THE INVENTION

1. Field of the Invention

The present invention relates to a fixed point signal processor, and more specifically to a fixed point signal processor having a high real-time processing capability.

2. Description of Related Art

Recent remarkably advanced LSI technology has elevated the processing speed and performance of a microprocessor, particularly a signal processor, which has an advanced audio or voice compression technology.

In order to realize a voice encoding processing having a high compression ratio, the signal processor has been required to have both a high arithmetic processing capability and a high arithmetic processing precision. In order to elevate the arithmetic processing precision, a bit width of input and output registers in the arithmetic processing must be sufficiently large.

On the other hand, a voice compression processing performed in the signal processor is generally based on a product-and-sum arithmetic operation in which two items of 16-bit data are multiplied and the result of multiplication is cumulatively summed.

Now, a fixed point arithmetic operation of "n"-bit data will be described with reference to FIG. 1. For example, "n"=16. As shown in FIG. 1, a pair of input data of "n" bits are supplied to a pair of inputs of a multiplication unit, and output data of the multiplication unit is "2n" bits. The width of a register for cumulating the output of the multiplication unit is on the order of "2n+α" bits.

The "α" bits are extended or extra bits for control of the product-and-sum arithmetic operation, for the purpose of holding an overflowed or underflowed condition of the product-and-sum arithmetic operation. In ordinary cases, the "α" bits are on the order of 4 bits or 8 bits.

Incidentally, the most significant bit (MSB) of each of the "n"-bit input data and the "2n"-bit multiplication result data is indicative of a sign bit "S". The radix point is determined between the sign bit "S" and an adjacent bit that is at the right side of the sign bit. Therefore, the right side adjacent bit is indicative of "½".

Since the number of significant digits is "n" bits, an effective "n"-bit portion of the obtained arithmetic operation result is saved into a data memory, and the saved effective "n"-bit portion is used as an input of the multiplication unit, in order to maintain the arithmetic operation precision.

Because of the above, a conventional signal processor has been constituted as shown in FIG. 2.

In FIG. 2, an ALU (arithmetic and logic unit) 31 is configured to perform a fixed point product-and-sum arithmetic operation, a shift operation, and other general arithmetic and logic operations. A memory data bus 32 has an "n"-bit width and is exclusively used for a memory access, and a main data bus 33 is a main bus also having an "n"-bit width.

General registers 34 have an "2n+α"-bit width, and are coupled to the ALU 31 for storing inputs and an output of the ALU 31. A selection circuit 35 is coupled between the general registers 34 and the memory and main data buses 32 and 33. When data on the memory data bus 32 or on the main data bus 33 is supplied to the general register 34, the selection circuit 35 extends the data of the "n"-bit width to the data of the "2n+α"-bit width. On the other hand, when data on the general register 34 is supplied to the memory data bus 32 or the main data bus 33, the selection circuit 35 selects and outputs either the most significant "n" bits or the least significant "n" bits of the "2n+α"-bit data.

A data memory 36 has an "n"-bit width, and is coupled to the memory data bus 32 and is used to save the arithmetic operation result in the general registers 34 through the memory data bus 32.

With the above mentioned arrangement, a processing called a "block floating" is ordinarily used in order to maintain a high arithmetic operation precision with a decreased amount of processing.

In this block floating processing, for a group of numerical data which has a bit width larger than the bit width of the dam memory and the inputs of the multiplication unit and which has correlation in a dynamic range between items of numerical data as can be typified by a voice signal, the group of numerical data are normalized in a common scale value (called a "block scale value" hereinafter), so that the arithmetic operation precision of the numerical data is maintained when the numerical data is saved to the memory or supplied to the input of the multiplication unit.

Referring to FIG. 3, there is shown a group of examples of fixed point data for which the block floating processing is performed. In FIG. 3, a group "a" composed of a plurality of items of numerical data having "2n+α" bits in length are the data of the arithmetic operation result. As shown, these items of numerical data in the group "a" correlate to each other in a dynamic range to each other. More specifically, the items of numerical data in the group "a" correlate to the fixed point representation of the numerical data.

In FIG. 3, in order to save the most effective "n" bits to the memory or to supply the most effective "n" bits to the multiplication unit, an "n"-bit portion of a data group "b" having opposite ends confined by dotted lines is selected. In addition, 11 bits of "0" continue from the MSB bit (inclusive) adjacent to the extended bits "α". Of the continuous "0" bits, the position of the "0" bit adjacent to the dotted line indicates the block scale value. Namely, the block scale value is 11 in the shown example.

The MSB bit of each numerical data in the data group "b" is allocated as a sign bit for each numerical data in the data group "b". The radix point is determined between the sign bit of the numerical data in the data group "b" and a fight side bit adjacent to the sign bit.

Specifically, normalization of the numerical data by the above mentioned block scale value means to select from the dam group "a" the data group "b" confined by the dotted lines on the basis of the scale value.

Incidentally, in FIG. 3, the MSB "n" bits and the LSB "n" bits can be directly accessed in units of one word for example in the case of "n"=16. However, each data of 16 bits in the data group "b" bridging the MSB "n" bits and the LSB "n" bits cannot be directly extracted, but can be extracted after performing a bit shifting processing.

Therefore, in the case that in the conventional signal processor shown in FIG. 2, the above mentioned block floating processing is performed for "m" items of numerical data, the following processing is performed.

First, the following steps (1), (2) and (3) are repeated "m" times for obtaining "in" scale values required.

(1) The data of the "2n+α"-bit width, which is the arithmetic operation result of the ALU 31, is outputted to the general registers 34 having the "2n+α"-bit width;

(2) A comparison processing is performed to search a maximum value of the data obtained in the step (1); and (3) The data of the "2n+α"-bit width held in the general registers 34 in the step (1) is modified, by the selection circuit 35, to a 2-word data in the form of "n×2" bits, and saved to the data memory 36 of the "n"-bit width, while maintaining the arithmetic operation precision.

As a result, the "m" items of numerical data of the "2n+α"-bit width, is saved in the data memory 36 in the form of "n×2" bits.

(4) The block scale value for the "m" items of numerical data is derived from the maximum value obtained in the step (2).

Next, the following steps (5), (6) and (7) are repeated "m" times for normalizing the "m" items of "2n+α"-bit data and storing the normalized data in the data memory 36 so that the numerical data can be supplied to the multiplication unit while maintaining the arithmetic precision.

(5) The data saved in the data memory 36 in the form of "n×2" bits is read out through the selection circuit 35 to the general register 34 in the form of "2n+α"-bit data;

(6) The data held in the general register 34 in the step (5) is shifted in the ALU 31 in accordance with the block scale value obtained in the step (4); and (7) MSB "n" bits of the data shifted in the step (6) are written to the data memory 36 of the "n"-bit width through the selection circuit 35 as the "n"-bit data obtained by normalizing the "2n+α"-bit data which is the arithmetic operation result in the step (1).

Thus, the group of "2n+α"-bit numerical data which is the result of the arithmetic operation processing in the step (1), is normalized to the "n" bits, and stored "m" items in the data memory 36.

With the above mentioned processing, in the case that the "2n+α"-bit data, which is the result of the arithmetic operation processing, is used as an "n"-bit input data for multiplication, the arithmetic operation precision can be maintained by using the "n"-bit data normalized in the steps (5), (6) and (7).

Incidentally, each of the steps (5), (6) and (7) corresponds to one instruction in the signal processor.

Here, the real-time processing capability of the signal processor depends upon an operating frequency (instruction cycle time) of the processor, which is limited by LSI technology.

However, a recent voice encoding system having an extremely high compression ratio, demands both a high arithmetic operation processing capability and a high arithmetic operation precision. Accordingly, the amount of arithmetic operations required in the signal processor for performing a high efficiency voice compression encoding is tremendous.

The required compression ratio is apt to increase more and more in the future, and therefore, the required amount of arithmetic operation processing will correspondingly increase more and more. Thus, the real-time processing capability of the signal processor will gradually approach a load limit in view of a relation between the operating frequency and the amount of arithmetic operation processing.

SUMMARY OF THE INVENTION

Accordingly, it is an object of the present invention to provide a signal processor which has overcome the above mentioned defect of the conventional one.

In order to avoid the above mentioned load limit, it is necessary to reduce the load of the signal processor by reducing the amount of arithmetic operation processing, for example, by substituting hardware for a portion, which has general-purpose properties and a high use frequency and which can be converted into hardware, of processings performed in a programmed operation in the prior art.

Accordingly, a specific object of the present invention is to provide a high performance signal processor having hardware for performing the block floating processing for the purpose of reducing the load of the signal processor, so that an increased amount of arithmetic operation processing can be performed in real time.

The above and other objects of the present invention are achieved in accordance with the present invention by a fixed point signal processor comprising:

an arithmetic operation means of "2n+α"-bit width, receiving input data of "n" bits width, for performing a predetermined arithmetic operation including a fixed point product-and-sum operation and a shift operation, where "n" is a positive integer larger than "1" and is indicative of a bit width of input data, and "α" is a positive integer indicative of a predetermined extended bit width;

a fast memory means of "2n+α"-bit width, for temporarily holding input and output data of the arithmetic operation means;

a second memory means of "n"-bit width, for saving data of "n"-bit width, which is a portion of the data stored in the first memory means;

a first selection means for extending the "n"-bit width data held in the second memory means to "2n+α"-bit width to output the extended data to the first memory means, the first selection means selecting an "n"-bit portion composed of continuous "n" bits from the "2n+α"-bit width data held in the first memory means, to output the selected "n"-bit portion to the second memory means in units of "n"-bit width;

a third memory means receiving the "2n+α"-bit width data held in the first memory means for saving a plurality of items of "2n+α"-bit width data;

a means for indicating a head position of continuous "n" bits in the "2n+α"-bit width data held in the third memory means; and a second selection means for selecting, from the "2n+a"-bit width data held in the third memory means, the continuous "n" bits starting from the head position indicated by the indicating means, to output the selected continuous "n" bits to the first selection means.

In a preferred embodiment, the third memory means includes a means for detecting a maximum normalized value in the plurality of items of saved "2n+α"-bit width data, and a third means for holding an output data of the detecting means.

With the above mentioned arrangement, a block floating processing is realized in hardware circuitry.

The arithmetic operation processing performed in a programmed operation in a conventional signal processor can be divided mainly into a processing for realizing a given algorithm and a processing for maintaining the arithmetic operation precision, typified by the block floating processing. This block floating processing is suitable to be realized in hardware, for the following reasons:

(A) The block floating processing is generally used in flag voice compression technology, and therefore, has general-purpose properties which are independent of the algorithm.

(B) In a VSELP (vector sum excited linear prediction) which is a Japanese digital automobile telephone system, it is necessary to treat data of 2K words per frame, by the block floating processing.

(3) The block floating processing can be realized by only data selection and transfer, and therefore, can be reduced or transformed into hardware having simple circuitry.

The above and other objects, features and advantages of the present invention will be apparent from the following description of preferred embodiments of the invention with reference to the accompanying drawings.

DESCRIPTION OF THE PREFERRED EMBODIMENTS

First Embodiment

Figure 4:
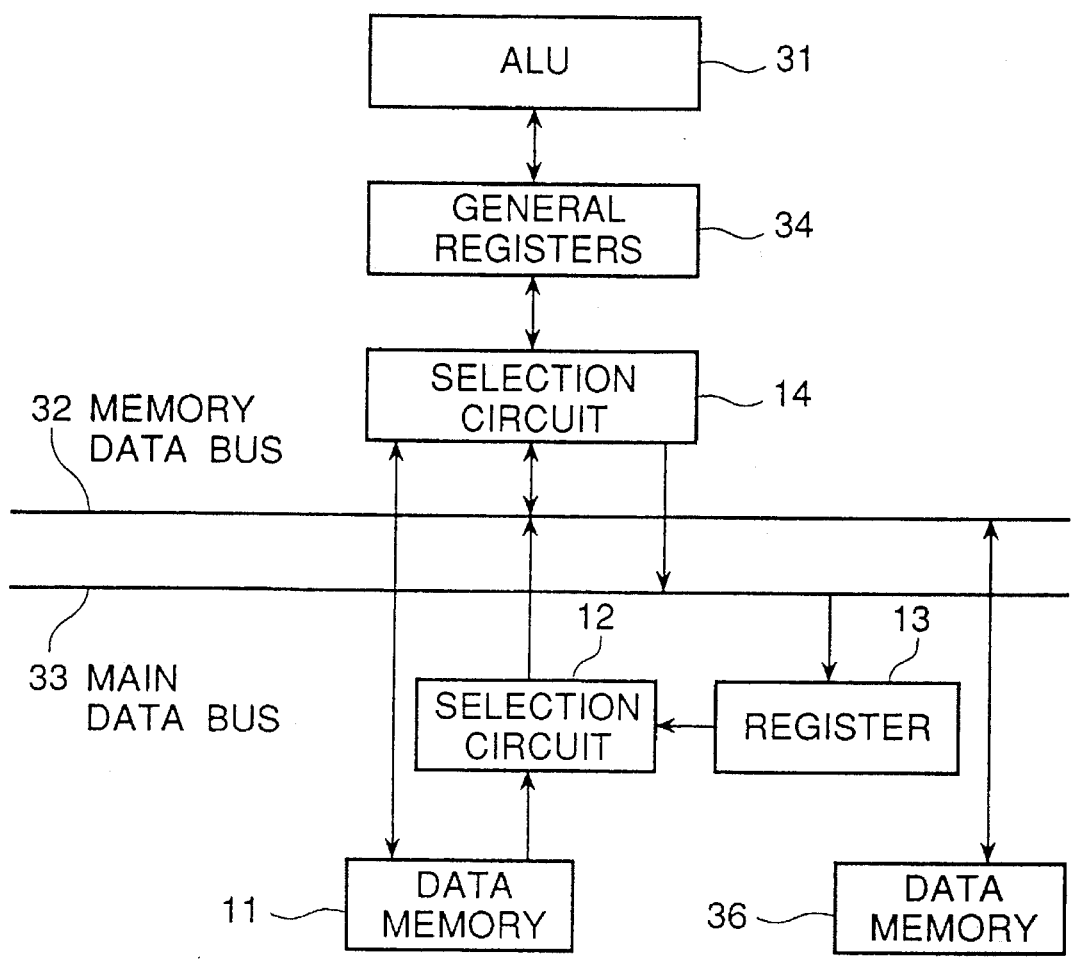
FIG. 4 is a block diagram of a first embodiment of the signal processor in accordance with the present invention.

Referring to FIG. 4, there is shown a block diagram of a first embodiment of the signal processor in accordance with the present invention. In FIG. 4, elements similar to those shown in FIG. 2 are given the same Reference Numerals, and therefore, explanation thereof will be omitted for simplification of description.

Figure 1:
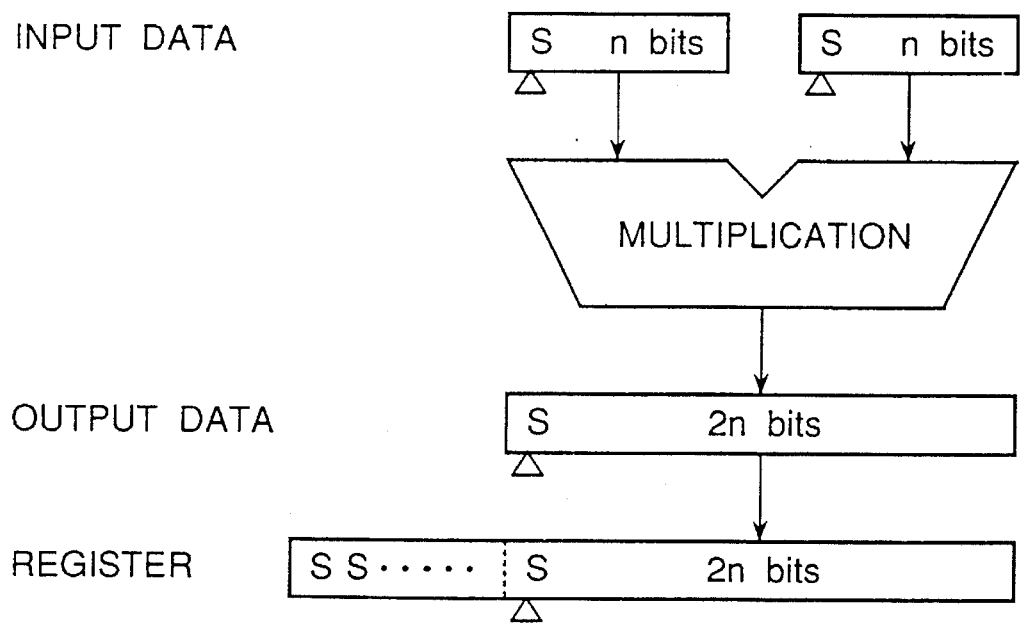
FIG. 1 illustrates a fundamental construction of a multiplication unit in a fixed point signal processor.
Figure 2:
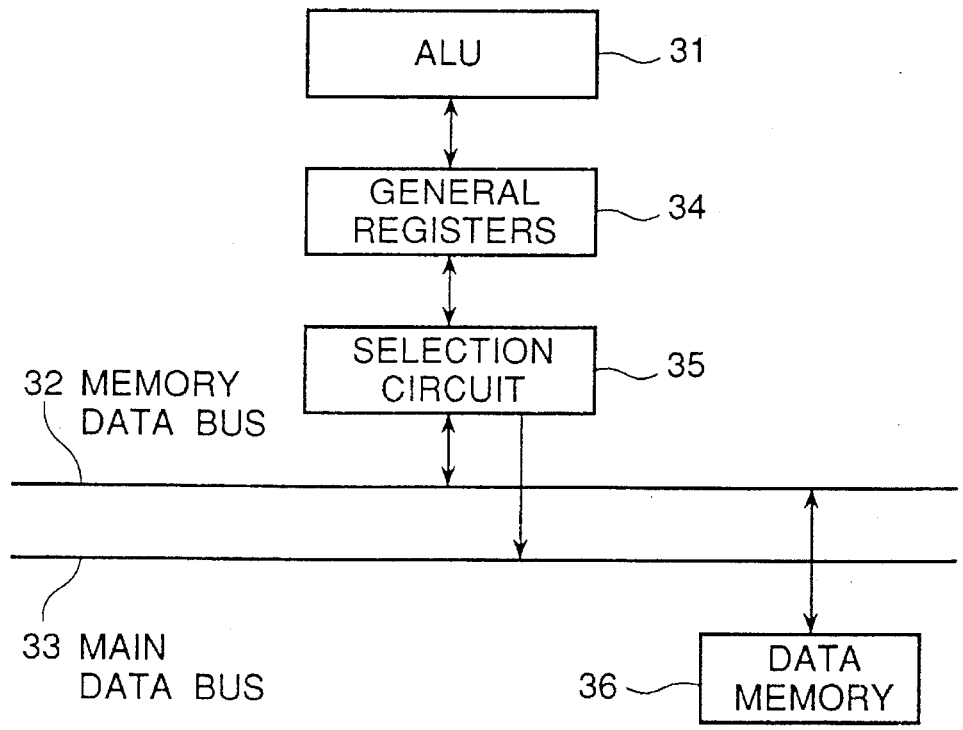
FIG. 2 is a block diagram of a conventional signal processor.
Figure 3:
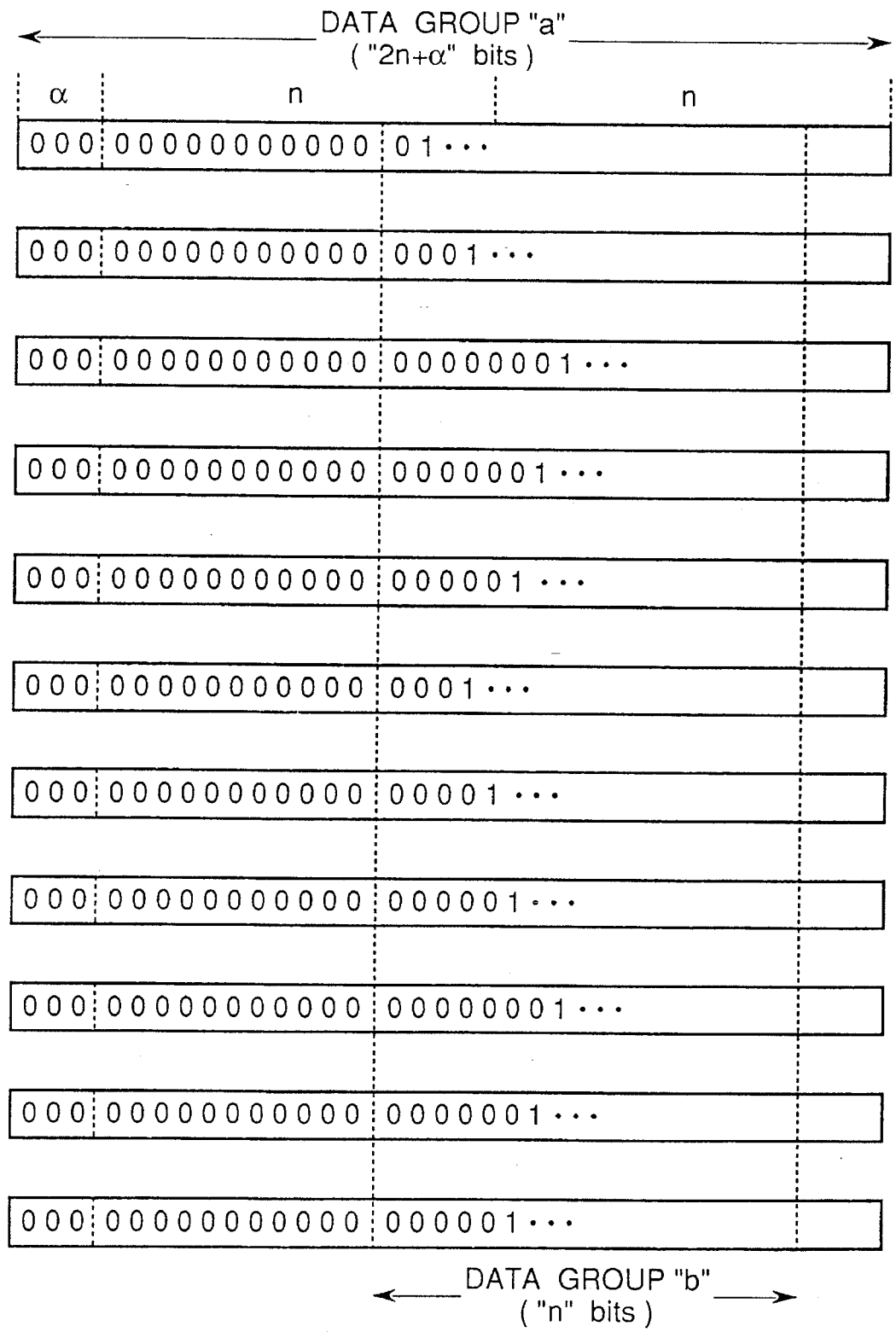
FIG. 3 illustrates a group of examples of fixed point data for which the block floating processing is performed.

In addition to the elements shown in FIG. 2, the first embodiment of the signal processor in accordance with the present invention includes a data memory 11, a selection circuit 12, and a register 13 and another selection circuit 14.

The data memory 11 is of "2n+α"-bit width, and is coupled to the selection circuit 14 to save the arithmetic operation result outputted to the general register 34, without modification. The selection circuit 12 is coupled to the data memory 11 and the memory data bus 32 so as to select continuous "n" bits starting from an arbitrary position in the "2n+α"-bit width data memory 11, and to output the selected continuous "n" bits to the memory bus 32. The register 13 is coupled to the main data bus 33 and is used for designating to the selection circuit 12 a head position of the continuous "n" bits selected by the selection circuit 12, namely, the block floating value.

On the other hand, the selection circuit 14, provided in place of the selection circuit 35 in FIG. 2, is coupled to the memory data bus 32, the main data bus 33 and the data memory 11. When data on the memory data bus 32 or data on the main data bus 33 is supplied to the general register 34, the selection circuit 14 extends the data of the "n"-bit width to the data of the "2n+α"-bit width. On the other hand, when "2n+α"-bit width data on the general register 34 is supplied to the "n"-bit width memory data bus 32 or the "n"-bit width main data bus 33, the selection circuit 14 selects continuous "n" bits in a predetermined extent (as selectable and accessible for example in units of one word) by for example selecting either the most significant "n" bits or the least significant "n" bits of the "2n+α"-bit data, and then, outputs the selected continuous "n" bits to the data bus. In the case that "2n+α"-bit width data on the general register 34 is supplied to the "2n+α"-bit width data memory 11, the selection circuit 14 outputs the "2n+α"-bit width data on the general register 34 to the data memory 11 without modification.

In the first embodiment of the signal processor, for "m" items of numerical data, the block floating processing as mentioned in the "Description of related art" is performed as follows:

First, the following steps (8), (9) and (10) are repeated "m" times for obtaining the scale value of the "m" items of numerical data.

(8) The data of the "2n+α"-bit width, which is the arithmetic operation result of the ALU 31, is outputted to the general register 34.

(9) A comparison processing is performed to search a maximum value of the data obtained in the step (8); and

(10) The data of the "2n+α"-bit width held in the general register 34 in the step (8) is saved, as it is, to the data memory 11 through the selection circuit 14.

As a result, the "m" items of numerical data of the "2n+α"-bit width, is saved in the data memory 11, as they are.

(11) The block scale value for the "m" items of numerical data is derived from the maximum value obtained in the step (9), and then, stored in the register 13.

With the above mentioned processing, when the "2n+α"-bit width data, which is the arithmetic operation result, is supplied as an "n"-bit input for multiplication, the arithmetic operation precision can be maintained by selecting the continuous "n" bits designated by the block scale value of the register 13, from the "2n+α"-bit width data memory 11 through the selection circuit 12, and then, using the selected continuous "n" bits as a normalized "n"-bit data.

The steps (8), (9), (10) and (11) in this first embodiment correspond to the steps (1), (2), (3) and (4) of the prior art processing mentioned hereinbefore. Accordingly, the steps (5), (6) and (7) required in the prior art processing are omitted in this first embodiment.

Second Embodiment

Figure 5:
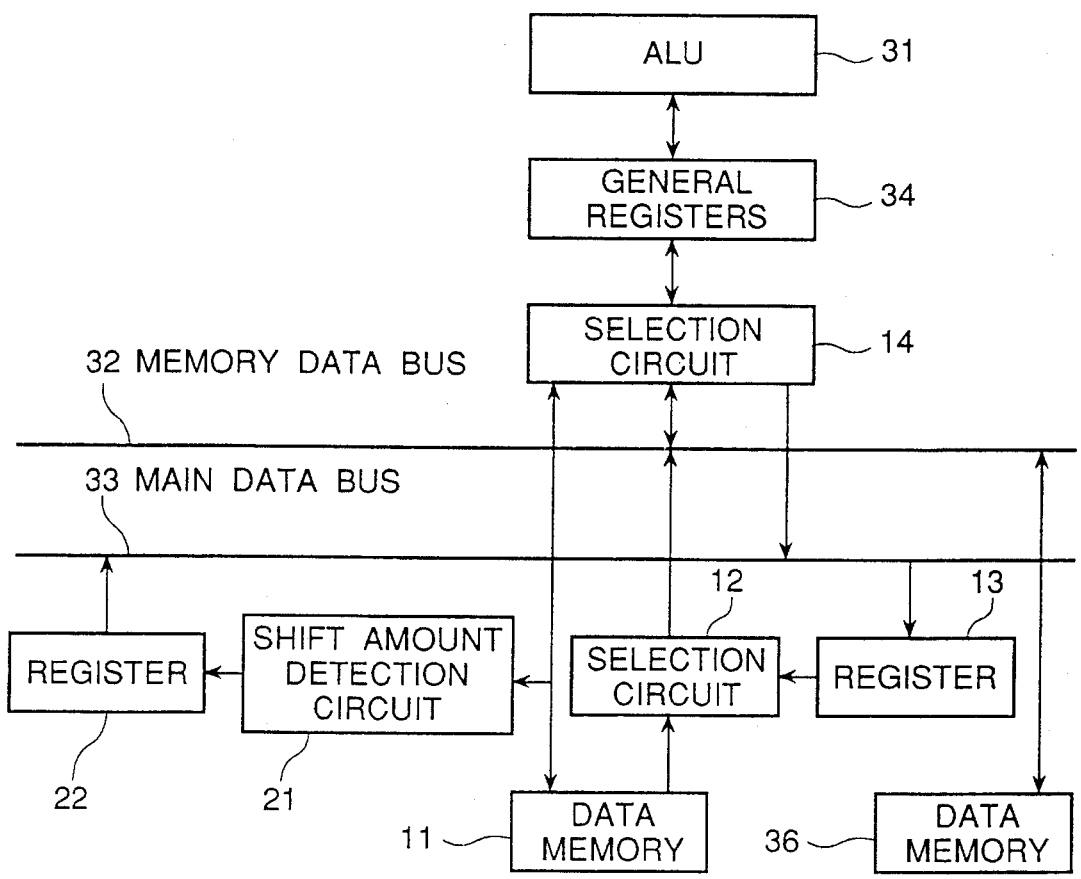
FIG. 5 is a block diagram of a second embodiment of the signal processor in accordance with the present invention.

Referring to FIG. 5, there is shown a block diagram of a second embodiment of the signal processor in accordance with the present invention. In FIG. 5, elements similar to those shown in FIGS. 2 and 4 are given the same Reference Numerals, and therefore, explanation thereof will be omitted for simplification of description.

As will be apparent from comparison between FIGS. 4 and 5, the second embodiment additionally includes a shift mount detection circuit 21 receiving the "2n+α"-bit width data supplied to the data memory 11 for detecting a normalizing bit number (shift mount or scale value) of the "2n+α"-bit width data, and for performing a comparison for the purpose of obtaining a maximum value of the normalizing bit number. Furthermore, the second embodiment includes a register 22 coupled to the shift mount detection circuit 21 for holding the maximum value of shift mount (block scale value) detected by the shift amount detection circuit 21 and to output the held maximum value of shift amount to the main data bus 33.

In the second embodiment of the signal processor, the block floating processing for "m" items of numerical data is performed as follows:

First, the following steps (12) and (13) are repeated "m" times for obtaining the block scale value of the "m" items of numerical data.

(12) The data of the "2n+α"-bit width, which is the arithmetic operation result of the ALU 31, is outputted to the general registers 34.

(13) The data of the "2n+α"-bit width held in the general registers 34 in the step (12) is saved, as it is, to the data memory 11 through the selection circuit 14.

As a result, the "m" items of numerical data of the "2n+α"-bit width, is saved in the data memory 11, as they are. In these steps, the block scale value for the "m" items of numerical data is detected by the shift mount detection circuit 21 and saved in the register 22.

(14) The block scale value saved in the register 22 is transferred and stored into the register 13.

With the above mentioned processing, when the "2n+α"-bit width data, which is the arithmetic operation result, is used as an "n"-bit input for multiplication, the arithmetic operation precision can be maintained similarly to the first embodiment, by selecting the continuous "n" bits in accordance with the block scale value of the register 13, from the "2n+α"-bit width data memory 11 through the selection circuit 12, and then, using the selected continuous "n" bits as a normalized "n"-bit data.

The steps (12), (13) and (14) in the second embodiment correspond to the steps (8), (10) and (11) in the first embodiment. Accordingly, the step (9) required in the first embodiment can be further omitted. Incidentally, the step (9) required in the first embodiment corresponds to three instructions in the signal processor.

Thus, the above mentioned embodiments can save in a memory the arithmetic operation result of a plurality of items of numerical data having a correlation in a dynamic range, while maintaining their arithmetic operation precision. When these saved items of numerical data are used as an input of arithmetic operation, normalized "n"-bit data can be used by the selection circuit.

In this connection, the first embodiment can omit the following processings which were performed in the conventional signal processor for each of arithmetic operation results:

(a) The processing of reading the "2n+α"-bit data temporarily stored in the data memory into the general register;

(b) The processing of normalizing the data in accordance with the block scale value; and (c) The processing of writing the normalized "n"-bit data into the data memory.

As a result, in the case of performing the block floating processing for a data group consisting of "m" items of numerical data in the first embodiment, the processing of "3×m" steps can be omitted in comparison with the conventional signal processor. Accordingly, it is possible to reduce the required steps by 300K steps per second, in VSELP (vector sum excited linear prediction) in which data of 2K words per frame is treated by the block floating processing.

In the second embodiment, furthermore, since the calculation or derivation of the block scale value is realized by the hardware circuitry, the required steps can be further reduced by "3×m" as compared with the first embodiment. In VSELP, accordingly, 600K steps per second can be omitted.

As will be apparent from the above, the signal data processor in accordance with the present invention can omit a series of program-operated steps required in connection with the arithmetic operation processing results for the conventional block floating processing. In other words, it is possible to greatly reduce the program-operated steps performed in the signal processor for a high performance voice encoding. Accordingly, the arithmetic operation processing capability can be elevated while maintaining the arithmetic operation precision of the signal processor. Therefore, it is possible to provide a signal processor most suitable to real-time processing for a high performance voice compression encoding.

The invention has thus been shown and described with reference to the specific embodiments. However, it should be noted that the present invention is in no way limited to the details of the illustrated structures but changes and modifications may be made within the scope of the appended claims.

I claim:

1. A fixed point signal processor comprising:

arithmetic operation means having a "2n+α"-bit width, for receiving input data of "n" bits width, and for performing a predetermined arithmetic operation including a fixed point product-and-sum operation and a shift operation, where "n" is a positive integer larger than "1" and is indicative of a bit width of input data, and "α" is a positive integer indicative of a predetermined extended bit width;

first memory means having a "2n+α"-bit width, for temporarily holding input and output data of said arithmetic operation means;

second memory means having an "n"-bit width, for saving data having an "n"-bit width, which is a portion of the data stored in said first memory means;

first selection means for extending the "n"-bit width data held in said second memory means to "2n+α"-bit width to output the extended data to said first memory means, said first selection means selecting an "n"-bit portion including continuous "n" bits from the "2n+α"-bit width data held in said first memory means, to output the selected "n"-bit portion to said second memory means in units of "n"-bit width;

third memory means for receiving the "2n+α"-bit data held in said first memory means and for saving a plurality of items of "2n+α"-bit width data;

means for indicating a head position of continuous "n" bits in the "2n+α"-bit width data held in said third memory means; and second selection means for selecting, from the "2n+α"-bit width data held in said third memory means, the continuous "n" bits starting from said head position indicated by said indicating means, to output the selected continuous "n" bits to said first selection means.

2. The fixed point signal processor according to claim 1 wherein said third memory means includes means for detecting a maximum normalized value in said plurality of items of saved "2n+α"-bit width data, and means for holding an output data of said detecting means.

3. The fixed point signal processor according to claim 1, wherein said third memory means includes means for detecting a maximum normalized value in said plurality of items of saved "2n+α"-bit width data.

4. The fixed point signal processor according to claim 1, wherein said third memory means is coupled to said first selection means and saves said "2n+α"-bit width data outputted to the first memory means, without modification.

5. The fixed point signal processor according to claim 1, further comprising a memory data bus coupled to said second selection means, wherein said second selection means is coupled to said third memory means, and outputs the selected continuous "n" bits to said memory data bus.

6. The fixed point signal processor according to claim 1, further comprising a main data bus coupled to said indicating means, wherein the continuous "n" bits selected by said second selection means comprise a block floating value.

7. The fixed point signal processor according to claim 6, further comprising a memory data bus coupled to said second selection means, wherein said second selection means is coupled to said third memory means and to said main data bus, and outputs the selected continuous "n" bits to said memory data bus.

8. The fixed point signal processor according to claim 1, wherein said first selection means outputs said "2n+α"-bit width data in said first memory means to said third memory means, without modification.

9. The fixed point signal processor according to claim 1, wherein the selected continuous "n" bits are utilized as normalized "n"-bit data by said second selection means.

10. A fixed point signal processor including:

a memory data bus having an "n"-bit width, where "n" is a positive integer larger than "1" and is indicative of a bit width of input data;

a main data bus having an "n"-bit width;

an arithmetic and logic unit (ALU) having a "2n+α"-bit width, where "α" is a positive integer indicative of a predetermined extended bit width;

a general register having a "2n+α"-bit width coupled to said ALU;

a first data memory having an "n"-bit width, coupled to said memory data bus;

a first selection circuit, coupled to said general register and to said memory data bus and said main data bus, for extending "n"-bit width data to "2n+α"-bit width to output the extended data to said general register when data on either said memory data bus or said main data bus is supplied to said general register, said first selection circuit selecting continuous "n" bits from the "2n+α"-bit width data held in said general register, to output the selected continuous "n" bits to said first data memory, when data on said general register is supplied to said first data memory;

a second data memory having a "2n+α"-bit width, coupled to said first selection circuit, for receiving the "2n+α"-bit width data held in said general register, when data on said general register is supplied to said first data memory, for saving a plurality of items of "2n+α"-bit width data;

a register, coupled to said main data bus, for indicating a head position of continuous "n" bits in the "2n+α"-bit width data held in said second data memory; and a second selection circuit coupled to said second data memory for selecting continuous "n" bits starting from the head position, from the "2n+α"-bit width data held in said second data memory, to output the selected continuous "n" bits to said general register.

11. The fixed point signal processor according to claim 10 further including:

a shift amount detecting circuit receiving the "2n+α"-bit width data when data on said general register is supplied to said second data memory, for detecting a maximum normalized value in said plurality of items of "2n+α"-bit width data saved in said second data memory, and a second register coupled to said shift amount detecting circuit for holding a maximum shift amount detected by said shift amount detecting circuit to output said maximum shift amount to said register through said main data bus.

12. The fixed point signal processor according to claim 3 further including:

a shift amount detecting circuit for receiving the "2n+α"-bit width data when data on said general register is supplied to said second data memory, and for detecting a maximum normalized value in said plurality of items of "2n+α"-bit width data saved in said second data memory.

13. The fixed point signal processor according to claim 12, further including:

a second register for holding a maximum shift amount detected by said shift amount detecting circuit to output said maximum shift amount to said register.

14. The fixed point signal processor according to claim 3, wherein said second data memory is coupled to said first selection circuit and saves said "2n+α"-bit width data outputted to the general register, without modification.

15. The fixed point signal processor according to claim 3, wherein said second selection circuit is coupled to said second data memory, and outputs the selected continuous "n" bits to said memory data bus.

16. The fixed point signal processor according to claim 3, wherein the continuous "n" bits selected by said second selection circuit comprise a block floating value.

17. The fixed point signal processor according to claim 16, wherein said second selection circuit is coupled to said second data memory, said register and to said memory data bus, and outputs the selected continuous "n" bits to said memory data bus.

18. The fixed point signal processor according to claim 17, wherein said first selection circuit outputs said "2n+α"-bit width data in said general register to the second data memory, without modification.

19. The fixed point signal processor according to claim 3, wherein said first selection circuit outputs said "2n+α"-bit width data in said general register to the second data memory, without modification.

20. The fixed point signal processor according to claim 3, wherein the selected continuous "n" bits are utilized as normalized "n"-bit data by said second selection circuit.

* * * * *